United States Patent Office 2,809,900
Patented Oct. 15, 1957

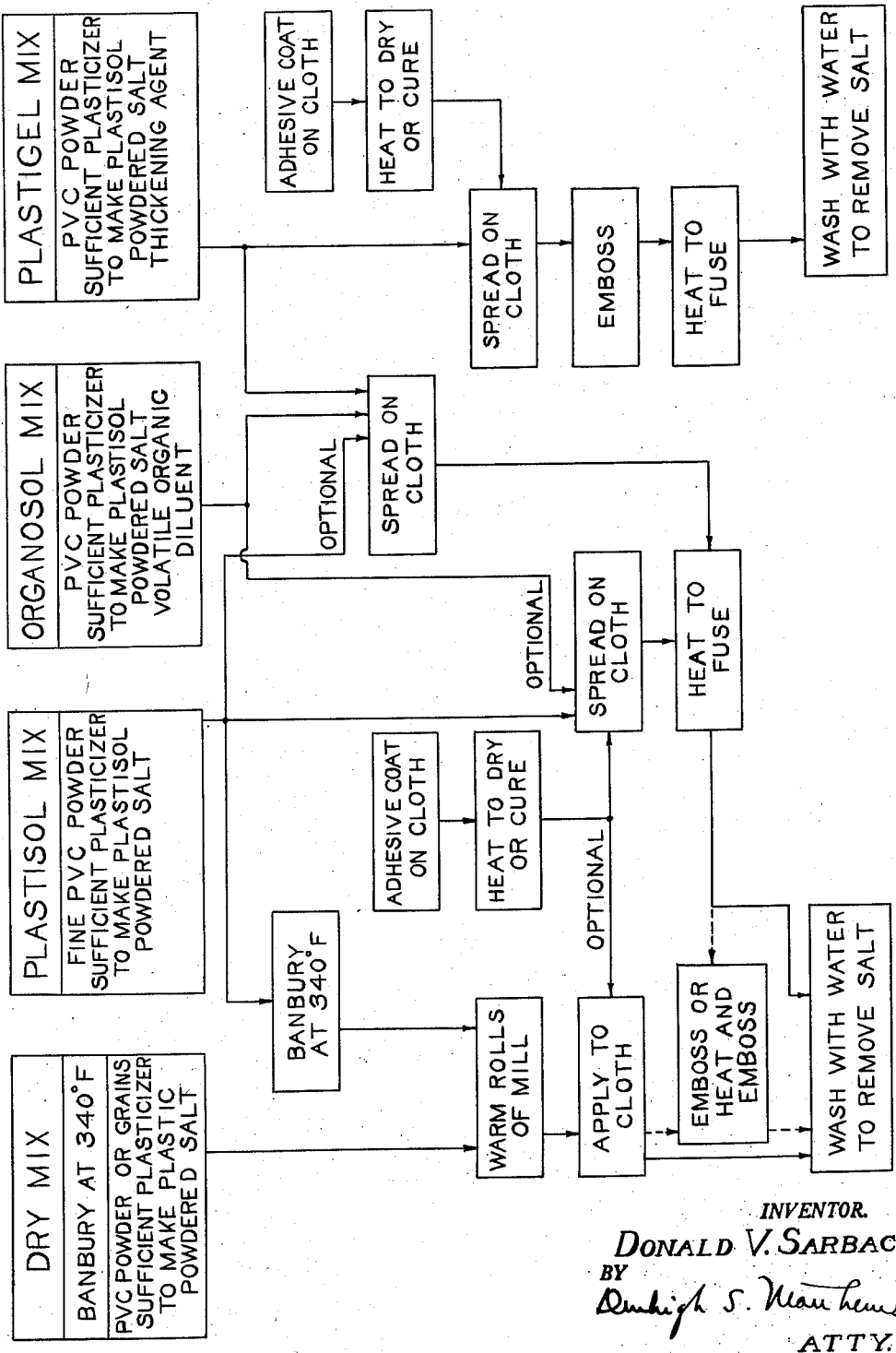

2,809,900

ARTICLE OF MANUFACTURE CONTAINING PLASTIC AND METHOD FOR MAKING THE SAME

Donald V. Sarbach, Cuyahoga Falls, Ohio, assignor to The B. F. Goodrich Company, New York, N. Y., a corporation of New York Application August 4, 1954, Serial No. 447,857

7 Claims. (Cl. 117—10)

The present invention relates to plastic films, sheets and the like. More particularly, it relates to a method for obtaining a flexible, vapor-permeable, water-resistant thermoplastic coated fabric, and to the product of such method.

When conventional plastic film such as polyvinyl chloride is used as a coating on a fabric base for upholstery material for furniture, automobiles and the like, it has been found that the film which is non-porous traps water, or moisture condenses on its surface, so that it tends to stick to the individual who comes in contact with it. Accordingly, such materials are uncomfortable. If holes are punched in the vinyl sheet or vinyl-coated fabric by mechanical or electrical means, they are necessarily so large that water will pass through the film. Moreover, such holes detract from the appearance of the vinyl and tend to be dirt catchers. The means to make the holes may also injure the base. Such factors seriously limit the uses of vinyl films and vinyl-coated fabrics where any appreciable amount of moisture vapor may condense on the surface. On the other hand, vinyls have excellent wearing properties, lend themselves well to various colors and to embossing to create novel designs, and can easily be cleaned. Accordingly, it is a primary object of the present invention to provide a method for producing a vinyl film and the like which is water-resistant, vapor-permeable, and abrasion resistant as well as washable and dirt resisting.

It is another object of this invention to provide a method for producing a vinyl resin-coated fabric base which is flexible, water-resistant, vapor-permeable and wherein said coating is adherent to the base.

Still another object is to provide films, sheets and the like of polymeric vinyl materials which are vapor-permeable, water-resistant and abrasion and dirt-resistant and can be cleaned readily.

A further object is to provide a flexible polymeric vinyl coated base or laminate wherein the vinyl coating is water-resistant, vapor-permeable, washable and dirt resistant.

These and other objects and advantages of the present invention will become more apparent to those skilled in the art from the following detailed description, examples and drawing which is a flowsheet illustrating several methods for practicing the present invention.

It has now been found according to the present invention that a polymeric composition comprising a polymer of monomeric material in which each constituent contains a single olefinic double bond and in which the predominant monomer is a haloethylene having from 1 to 2 halogen atoms selected from the group consisting of chlorine, bromine and fluorine atoms on only one carbon atom and from about 50 to 300% by weight based on the weight of the polymer of a powdered or finely-divided non-hygroscopic material soluble in a non-solvent for the polymeric composition can readily be deposited as a layer, film or sheet and subsequently treated with a solvent for the powdered, non-hygroscopic material to remove the same to afford a water-resistant, vapor permeable article. Air can easily pass through the article. However, water does not readily, if at all, penetrate the aritcle which actually can withstand a hydrostatic head of up to 35" or more of water. The layers or films are very abrasion-resistant. They also can be deposited as plasticized composition coatings on supporting bases or webs to form adherent flexible water-resistant, vapor-permeable laminates.

As shown by the flowsheet of the drawing several methods may be used to prepare water-resistant, vapor-permeable plastic or polymeric material coated fabrics and while the flowsheet discloses the use of polyvinyl chloride and salt, it is to be understood that this is for illustrative purposes as other haloethylene polymers and other powdered non-hygroscopic materials may be used. Moreover, while it is preferred to support the film or sheet by means of a cloth or fabric backing, acceptable water-resistant and vapor-permeable films and sheets can be produced without a backing or support. For example, the polymeric material in dry powder or granular form is mixed with sufficient plasticizer to plasticize the polymer and salt in a Banbury or other mixer at about 340° F., warmed on rolls, applied to cloth by calendering and laminating and washed to remove the salt. If it is desired to provide a design on the surface of the polymer, the polymer-coated fabric may be passed through embossing rolls prior to washing. It is much preferred to emboss prior to washing to avoid closing the pores of the polymer under the design of the embossing roll. Moreover, the fabric may be coated with adhesive and dried prior to calendering the polymer layer thereto if it is desired to increase the adhesion between the fabric base and the polymer layer. Instead of using a dry powdered or granular polymer, the Banbury may be charged with a plastisol. Plastigels or organosols may also be charged to the Banbury but they offer little advantage as they are more economically spread onto the fabric. Moreover, both sides of the fabric may be coated and additional polymer coatings may be applied to the polymer coating on the fabric base if deemed necessary by using any one of the procedures disclosed herein.

Other methods of applying the vinyl-salt composition to the fabric base may also be used. For example, the composition is calendered and the fabric is run between the last two rolls of the calender machine with the composition banked onto the fabric. Or, the composition is calendered and the fabric is run over a rubber laminating roll which laminates the fabric to the sheet on the last roll of the calender. Still another process is to calender a sheet of the composition and feed the composition sheet to a separate laminator where the composition sheet and fabric are laminated together between the two pressure rolls of the laminator.

In spread coating the fabric base, a plastisol is generally used although plastigels or organosols may also be employed. The plastisol is made by mixing finely-divided or powdered polymeric material with sufficient plasticizer to make a plastisol and salt at a temperature below the gel point of the polymer mix, casting, roller coating or spreading the mix on the fabric base, heating to gel and fuse and washing to remove the salt. Embossing of the polymer-coated fabric, if desired, should precede washing. The fabric may contain an adhesive on its surface which helps in securing the polymer layer to the fabric and helps to prevent seepage of plasticized polymer through the fabric. If a thinner plastisol composition is desired, a volatile organic diluent or solvent may be added to the plastisol prior to spreading to make an organosol. Of course, sufficient time should be allowed during the heating step to permit evaporation of the diluent, and additional equipment to carry off the vapors of the diluent or to prevent explosions or fires may be required when using the organosol composition.

Moreover, the plastisols or organosols can be cast or spread as a film or sheet onto a belt of stainless steel or other material to which it will not adhere readily. A fabric web is then laminated to the cast film before or after fusing. After fusing the film, the laminate is readily stripped from the belt. Alternatively, the plastisol or organosol can be cast onto such a belt, fused, cooled, stripped off the belt and laminated or cemented to the fabric base.

The plastigel mix is prepared and handled in much the same way as the plastisol composition except that a thickening agent is added to the plastisol mix to stiffen the same. The plastigel mix is then spread onto the fabric base and then embossed or a design pressed on its surface, fused, and washed to remove the salt. Alternatively, the embossing or pressing step can be omitted if desired although the use of embossing prior to fusing is a feature of the use of plastigels which retain their form when embossed. Moreover, embossing may follow the fusing or washing steps but such procedure is not too desirable. Furthermore, the fabric base may have been coated previously with adhesive if desired.

It also will be appreciated that the water-resistant, vapor-permeable vinyl films or sheets of the present invention can be employed without conventional plasticizers where a rigid material is desired. Such vinyls can contain processing aids and materials to improve impact resistance which are well known to the art. These are easily prepared by mixing the polymer on a hot mill with the processing aids, impact resistance improving material and salt, sheeting out to the desired thicknesses, cooling and washing.

While the foregoing comments have largely been directed to vapor-permeable water-resistant vinyl films laminated to a supporting fabric base, it will be understood that films, sheets and the like of vinyl materials which are vapor permeable and water-resistant can be obtained which are unsupported and which are useful. They can be prepared by calendering, casting, or spread coating the vinyl salt mix on a belt. After fusing the vinyl where a plastisol and the like has been used, they can be stripped from the base material such as a stainless steel belt and washed or cooled and washed.

The polymeric material used in practice of the present invention includes all of the haloethylene polymers composed predominantly of a polymerized haloethylene having from one to two halogen atoms selected from the group consisting of chlorine, bromine and fluorine atoms attached to only one of the carbon atoms, such as homopolymers of vinyl chloride, vinyl bromide, vinyl fluoride, vinylidene chloride, vinylidene bromide, or vinylidene fluoride and interpolymers or copolymers of two or more of these monomers. Copolymers or interpolymers made from monomeric mixtures containing at least one haloethylene monomer together with a lesser amount of one or more copolymerizable monoolefinic monomers can also be employed. Monoolefinic materials which can be co- or interpolymerized with the haloethylene monomers include vinyl esters such as vinyl acetate, vinyl propionate, vinyl butyrate, vinyl chloroacetate, vinyl chloropropionate, vinyl benzoate, vinyl chlorobenzoate, and others; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; vinyl aromatic compounds such as styrene, dichlorostyrene, vinyl naphthalene and others; alkyl esters of maleic and fumaric acids such as dimethyl maleate, diethyl maleate, and others; vinyl alkyl ethers and ketones such as vinyl methyl ether, vinyl ethyl ether, vinyl isobutyl ether, 2-chloro-ethyl vinyl ether, methyl vinyl ketone, ethyl vinyl ketone, isobutyl vinyl ketone, etc.; and in addition other monoolefinic materials such as vinyl pyridine, N-vinyl carbazole, N-vinyl pyrrolidone, ethyl methylene malonate, isobutylene, ethylene, trichloroethylene, and various other readily polymerizable compounds containing a single olefinic double bond, especially those containing the $CH_2=C<$ group. When utilizing interpolymers or copolymers, the proportions of the various monomers in the monomeric mixtures polymerized to give the interpolymer may be varied considerably as long as the haloethylene monomer constitutes at least 50% by weight of the total. For example, there may be used copolymers of from 50 to 99%, or more preferably from 70 to 95%, by weight of the haloethylene monomer, together with from 1 to 50%, more preferably from 5 to 30%, by weight of a vinyl ester, or an acrylic or methacrylic ester or any of the other monoolefinic materials mentioned above, or any two, three, four, or more of these. Tripolymers of from 50 to 90% by weight of vinyl chloride, from 5 to 45% by weight of vinylidene chloride, and from 5 to 45% by weight of a vinyl ester such as vinyl acetate or vinyl benzoate, or an acrylic or methacrylic ester are examples of vinyl halide polymers which may be used. Of the various polymers disclosed herein, those composed of a vinyl halide, especially vinyl chloride, and of a predominant amount of a vinyl halide and of a minor amount of a vinylidene halide, especially copolymers of a predominant amount of vinyl chloride and a minor amount of vinylidene chloride, and blends of these polymers and copolymers are preferred. Blends or mixtures of the homopolymers, copolymers and interpolymers can also be used. Where the haloethylene polymer is to be calendered onto the fabric base, the polymer prior to mixing with plasticizer may be in the form of pellets, granules or powder. However, when making plastisols and the like used for spread casting, the polymer should be in the form of powder and may be porous.

Examples of suitable plasticizers for the haloethylene polymers are octyl diphenyl phosphate, tricresyl phosphate, tributoxy-ethyl phosphate, dioctyl adipate, dioctyl azelate, dioctyl phthalate, dibutyl phthalate, or mixtures thereof. Other plasticizers which are employed are hexachlorodiphenyl oxide, toluene sulfonamide-aldehyde resin, and a composition comprising a water-insoluble thermoplastic cellulose ether, di(4-tertiary butyl phenyl) monophenyl phosphate and di(4-tertiary butyl phenyl) mono-(5-tertiary butyl-2-xenyl) phosphate. The plasticizers are used in amounts necessary to give the required flexibility in the final fused polymer and may vary widely depending on ultimate use of the polymer. Plasticizers are also used in an amount necessary to afford dry pourable powders to liquid-like masses. For example from about 30 to 200 parts by weight of plasticizer can be used for every 100 parts by weight of the polymer although for best results it is preferable that the polymeric composition comprise from about 50 to 100 parts by weight of plasticizer for 100 parts of the polymeric material present. When making a calender mix the plasticizer and polymeric material may be mixed in a Banbury or other suitable mixer and the temperature may go above the gel point and as high as about 340° F. while, when making plastisols, the temperature during mixing should be below the gel point and preferably not above room temperature, about 25° C. to provide a liquid composition having a viscosity of from 200 to 40,000 centipoises and up to 130,000 centipoises.

Plastigels are prepared by adding a minor amount of a thickening agent such as a metallic soap (sodium stearate, calcium stearate, aluminum distearate, lithium distearate, magnesium stearate, lithium hydroxy stearate) to the plastisol compositions described above. Generally, 5 to 10 parts by weight of said soap are used for every 100 parts by weight of plastisol. The plastigels are putty-like masses and retain their form when embossed and after embossing can be fused in the fusing temperature range of from about 300 to 400° F. It will be understood that a minor amount of the soap used in forming plastigels may come out of the plastic when it is washed with water to remove the salt when it is used as the non-hygroscopic material. However, a major amount of the soap remains in the plastic so that water may be considered a non-solvent in such cases for the thickening agent.

Organosols used according to the teaching of the present invention are prepared by adding a minor amount, such as 10 to 50% by weight based on the weight of the plastisol, of a volatile organic diluent such as mineral spirits, toluene, and the like to the above described plastisol composition or by replacing part of the plasticizer with diluent. Organosols are more fluid than the plastisols and are desirable to use where increased fluidity is desired or where some penetration of the fabric base is indicated.

The non-hygroscopic material used to form the small pores of the present composition should be insoluble or only sparing soluble in the polymer, plasticizer and other compounding ingredients. The non-hygroscopic material should also be soluble in a non-solvent for the polymer, plasticizer and other compounding ingredients. moreover, it should be a solid and not melt, soften, decompose or react in the polymeric composition at fusing or embossing temperatures. Materials found useful in practice of the present invention are the alkali metal halide salts such as sodium chloride, potassium chloride, sodium bromide, potassium bromide, and the like and mixtures thereof which are readily soluble in water which is essentially a non-solvent for the polymeric composition. Other materials exhibiting the aforementioned properties can likewise be used in the practice of the present invention. The non-hygroscopic material may be added to the polymer-plasticizer mix in the Banbury or to the polymer-plasticizer mix on the mill rolls if mill mixing is used. It also can be mixed with the plastisol, plastigel or organosol during formation of these compositions or after they have been formed taking care to avoid raising the temperature much above room temperature, as in the case of the plastisols, to avoid gelling. The non-hygroscopic, pore-forming material should be in a finely-divided or powdered condition to provide after removal from the polymer very small pores or a microporous structure in which substantially all, or all of the pores are interconnecting. Preferably essentially all of the particles should pass through about a 65 mesh USS screen and a predominant amount through about a 100 mesh USS screen. While particles of a somewhat larger size can be employed, they should not be in chunk form or of a granulated size since the structure formed is too porous and will not retain a static head of water. Moreover, a film or sheet having large pores does not present a continuous, smooth and uninterrupted surface to the naked eye as is exhibited by the product of the present invention. The pores in the film are just barely visible to the naked eye when looking at the cut edge of the film. Furthermore, large pores tend to collect and retain dust, dirt, and the like. On the other hand, somewhat smaller mesh size non-hygroscopic material can be used but it should not be very substantially finer than that shown above to avoid loss of vapor permeability. The amount of non-hygroscopic material will vary from about 50 to 300% by weight based on the weight of the polymer in the composition. Larger or smaller amounts of non-hygroscopic material are undesirable as such tend to decrease vapor permeability or lower water resistance.

The polymeric haloethylene compositions disclosed herein may also contain minor amounts of stabilizers such as basic lead carbonate, lead oxide, alkaline earth silicates, lead silicate, lead stearate, titanium dioxide, lead phenolate and the like. Desirably such stabilizers are used in an amount of from 0.1 to 10 parts by weight per 100 parts by weight of vinyl polymer. Processing aids such as a minor amount (5%) of a copolymer of about 75% by weight of styrene and the balance acrylonitrile and an impact resistance improving material (5%) such as a copolymer of about 67% butadiene-1,3, 17% styrene and 16% acrylonitrile can also be employed. Other compounding ingredients may also be incorporated in the vinyl polymer or polymer composition such as fillers, dyes and color pigments, herbicides, germicides, fungicides, minor amounts of rubbery butadiene-1,3 and acrylonitrile copolymers, and the like. Detergents such as Sotex CW (compounds of long-chain fatty acid esters of multiple ether amine linkages), Santomerse S (salts of substituted aromatic sulfonic acids), Aerosol 18 (N-octadecyl disodium sulfosuccinamate), and the like, in amounts of from 0.5 to 5 parts per 100 parts of polymer may be added to the polymer composition.

The porous web or fabric base which is desirably used to support the polymer is preferably of the open-weave type which is capable of elongation, such as netting, although other weaves such as drill, twill and the like may be used. While sized fabric can be used, it is preferred to employ unsized fabric. The fabric itself may be of cotton, wool, or other natural materials, paper, synthetics, or mixtures thereof, which are capable of withstanding the fusing temperatures of vinyls without appreciably losing their shape, strength and the like.

The polymeric composition containing the powdered, nonhygroscopic material can be hot calendered (about 250–500° F.) and fed to a roll to secure the polymer sheet to the fabric base which has been heated. If desired, the fabric can first be treated with an adhesive (about 1 ounce per square yard) and dried to provide increased adhesion between the polymer and the fabric base although satisfactory adherence has been obtained without using adhesives. Where plastisols and organosols are employed, the adhesive-coated base fabric is desired to reduce penetration of plasticized polymer into and between the interstices of the cloth and to reduce stiffening of the finally obtained laminate. Examples of suitable adhesives are plasticized polyvinyl chloride latices, latices of mixtures of copolymers of butadiene-1,3 and acrylonitrile and polyvinyl chloride, and the like.

After applying the polymer layer to the fabric base, it can be embossed, or heated and embossed if it has cooled, to provide a design on the surface of the laminate where other than a perfectly plain or smooth surface is desired and washed with water to remove the salt. Desirably, the water can contain from about 0.01 to .50% by weight of a detergent to increase the wettability of the water for the salt contained in the polymer. The time of washing may vary from a few minutes to several hours or more depending on the amount of salt, thickness of coating, degree of agitation, method of washing, etc. Other solvents besides water can, of course, be used to remove the finely-divided non-hygroscopic material. After washing, the sheet or laminate may be dried in air at room tempertaure or heated in an oven at a temperature of from about 100–175° F. or higher.

The laminate obtained according to the present invention has a thin fused polymer coating of about .010 to .030″ thick secured to the fabric base. Very thick coatings can of course be obtained by varying the spacing between the calender rolls or the amount of plastisol, etc., used. Very thick coatings however are not desired as they tend to reduce moisture vapor transmission. Laminated fabrics prepared according to the present invention are flexible, washable, water-resistant and vapor-permeable. The water vapor transmission of the laminate will vary from about 50 to 200 grams $H_2O$/100 in.$^2$/24 hrs. and the hydrostatic pressure (Suter) will vary from about 15 to 35 in. $H_2O$. Their abrasion resistance index (using double rubs with sandpaper) will be from 2,000 to 8,000. The laminate is easy to wash and does not hold dirt or other foreign matter and can be embossed, preferably prior to removal of the non-hygroscopic material, to simulate leather, special fabric weaves, etc. In addition to embossing, the material can be printed with decorative or leather-like designs, etc., and can be topcoated by printing, spraying, spreading or roller coating to improve slip, hand, and abrasion resistance without appreciably detracting from its vapor permeability either before or after washing the salt out. Such procedures also do not adversely affect the ease of washing out the salt.

The following examples will serve to illustrate the invention with more particularity to those skilled in the art.

EXAMPLE I

A plastisol was prepared by mixing the ingredients listed below at room temperature (about 25° C.):

| Components | Parts by Weight |
|---|---|
| Powdered copolymer of about 5% vinylidene chloride and balance vinyl chloride | 30 |
| Powdered polyvinyl chloride | 70 |
| Dioctyl phthalate | 24.7 |
| Dioctyl adipate | 30.0 |
| Polyethylene glycol di-2-ethyl hexoate | 5.0 |
| Viscosity reducing material—Sotex CW | 2.0 |
| Barium stearate | 2.0 |
| Harshaw stabilizer 2-V-4 (Cadmium alkyl aryl phosphite) | 2.0 |
| Powdered NaCl of following USS Screen size: 1% retained # 65 mesh. 1% retained # 80 mesh. 14% retained #100 mesh. 84% through #100 mesh. | 211.0 |

The resulting plastisol was spread on cotton cloth, 20 oz./sq. yd., heated to about 340° F. to gel and fuse the polymer blend, coated and washed to remove the salt. The coating was about .015″ thick and was flexible, smooth and glossy and adherent to the fabric base. No pores were visible to the naked eye when looking perpendicularly to the cloth although when the cloth was cut and viewed on edge, pores were just visible. When tested, it exhibited a moisture vapor transmission of 140 grams $H_2O/100$ in.$^2$/24 hrs. and a Suter hydrostatic head of 18″ $H_2O$.

EXAMPLE II

Plasticized compositions were prepared by mixing the ingredients listed below in a Banbury at about 340° F.:

| Components | Parts by Weight | |
|---|---|---|
| | Composition A | Composition B |
| Powdered polyvinyl chloride (average mol wt.—58,000) | 100 | 100 |
| Dioctyl phthalate | 22 | 22 |
| Dioctyl adipate | 20 | 20 |
| Santicizer 141 (alkyl aryl phosphate-plasticizer) | 20 | 20 |
| Stabilizer and lubricant paste | 4 | 4 |
| Powdered NaCl of same mesh size as Example I | 219 | 219 |
| Green color paste | 3.305 | |
| Blue color paste | | 6.588 |

The stabilizer and lubricant paste comprised about:

2.07% dioctyl phthalate
36.08% Harshaw Chem. Co. 2-V-1 stabilizer (cadmium organic octyl hexyl phenyl phosphite complex)
24.05% Harshaw Chem. Co. 7-V-1 stabilizer (epoxy and chelating composition)
36.08% barium stearate
1.72% calcium silicate After Banburying, each polymer stock was milled for a short time on smooth, heated, production mill rolls, passed through hot calenders (top roll—230° F., middle roll 290° F., and bottom roll 310° F.), and fed at from 5 to 9 yards per minute to a rubber laminating roll where it was laminated to several kinds of cloth which had been passed under infra red lamps prior to receiving said sheeted polymer to provide a coating on said cloth of about 20 oz./yd.$^2$. The polymer-coated fabrics were then embossed and washed in water containing about .05% by weight of a detergent, Triton X–100 (alkyl aryl polyether alcohol), to remove the salt and provide thin, flexible adherent laminates. The types of fabric base used and the properties of the resulting laminates are shown in the table below:

Table

| Fabric Used | Final Coating, Wt.-oz./yd.$^2$ after washing | MVT, Gms. $H_2O/100$ in.$^2$/24 hrs. | Suter Hydrostatic, in. $H_2O$ | Abrasion Index, Double Runs with Sandpaper |
|---|---|---|---|---|
| Blue (Comp. B) on 1.85 Drill previously coated and dried with 1 oz./yd.$^2$ vinyl latex | 10.6 | 77 | 22 | 2,430 |
| Blue (Comp. B) on 1.85 Drill | 11.7 | 83 | 26½ | 3,580 |
| Green (Comp. A) on 1.85 Drill | 8.3 | 136 | 26 | 2,860 |
| Green (Comp. A) on Netting | 7.9 | 107 | 19½ | 7,440 |

When using other powdered salts such as sodium bromide, potassium chloride, and potassium bromide and other copolymers such as vinyl chloride-vinyl acetate, vinyl chloride-ethyl acrylate, and vinyl chloride-methyl acrylate, in place of sodium chloride and polyvinyl chloride in the composition and method of Example II, similar, flexible, thin, adherent, water-resistant and vapor-permeable laminates were produced.

In summary, the present invention teaches that thin, water-resistant, vapor-permeable films, sheets or laminates can readily be prepared from polymers or copolymers of haloethylene compounds containing a powdered, non-hygroscopic material soluble in a non-solvent for the polymer and removing said non-hygroscopic material from the fused or set polymer by treatment with a solvent which is a non-solvent for the polymer. The films or sheets are smooth and can be embossed to simulate leather and materials of various kinds as well as certain novel weaves and other designs. The unsupported films and sheets and the laminates prepared according to the present invention will find utility as upholstering material in furniture and automobiles, clothing, footwear and the like.

What is claimed is:

1. The method which comprises mixing together to form a homogenous appearing composition a processable polymer of a monomeric material in which each constituent contains a single olefinic double bond and in which the predominant monomer is a haloethylene selected from the group consisting of vinyl chloride, vinyl bromide, vinyl fluoride, vinylidene chloride, vinylidene bromide, vinylidene fluoride and mixtures thereof and from about 50% to 300% by weight based on the weight of said polymer of a powdered, non-hygroscopic material soluble in a non-solvent for said polymer, essentially all of the particles of said non-hygroscopic material passing through about a 65 mesh USS screen and a predominant amount of said particles passing through about a 100 mesh USS screen, forming a thin layer of the resulting composition on a base, heating said layer to fuse said layer and treating said fused layer with a solvent which is a solvent for said non-hygroscopic material and is a non-solvent for said polymer to remove said non-hygroscopic material from said layer to provide a vapor-permeable, water-resistant polymeric layer.

2. The method which comprises mixing together below gelling temperature to form a homogenous appearing composition a polymer of a monomeric material in which each constituent contains a single olefinic double bond and in which the predominant monomer is a haloethylene selected from the group consisting of vinyl chloride, vinyl bromide, vinyl fluoride, vinylidene chloride, vinylidene bromide, vinylidene fluoride and mixtures thereof and a plasticizer in an amount at least sufficient to form a plastisol with said polymer and from about 50 to 300% by weight based on the weight of said polymer of a powdered, non-hygroscopic material soluble in a non-solvent for said polymer and plasticizer, essentially all of the particles of said non-hygroscopic material passing through about a 65 mesh USS screen and a predominant amount of said particles passing through about a 100 mesh USS screen, spreading the resulting composition as a thin coating on at least one side of a porous web, heating said coating to fuse the same, and washing said web containing said fused coating with a solvent which is a solvent for said non-hygroscopic material and is a non-solvent for said polymer and plasticizer to remove said non-hygroscopic material from said coating to provide a laminate containing a water-resistant, vapor-permeable plasticized polymeric coating on said web.

3. The method according to claim 2 in which said polymer comprises polyvinyl chloride and said non-hygroscopic material comprises sodium chloride.

4. The method according to claim 2 in which said polymer comprises a mixture of polyvinyl chloride and a copolymer of vinyl chloride and vinylidene chloride and said non-hygroscopic material comprises sodium chloride.

5. The method which comprises mixing together to form a homogenous appearing composition a polymer of a monomeric material in which each constituent contains a single olefinic double bond and in which the predominant monomer is a haloethylene selected from the group consisting of vinyl chloride, vinyl bromide, vinyl fluoride, vinylidene chloride, vinylidene bromide, vinylidene fluoride and mixtures thereof, a plasticizer in an amount at least sufficient to form a plastisol with said polymer, a minor amount of a thickening agent to form a plastigel of said plastisol, and from about 50 to 300% by weight based on the weight of said polymer of a powdered, non-hygroscopic material soluble in a non-solvent for the other ingredients of the plastigel, essentially all of the particles of said non-hygroscopic material passing through about a 65 mesh USS screen and a predominant amount of said particles passing through about a 100 mesh USS screen, spreading the resulting plastigel composition as a thin coating on at least one side of a porous web, heating said coating to fuse the same, and washing said web containing said fused coating with a solvent which is a solvent for said non-hygroscopic material and is essentially a non-solvent for the other ingredients of said coating to remove said non-hygroscopic material from said coating to provide a water-resistant, vapor-permeable plasticized polymer coating on said web.

6. The method which comprises mixing together at a temperature at least sufficient to cause gelation and to form a homogenous appearing composition a polymer of a monomeric material in which each constituent contains a single olefinic double bond and in which the predominant monomer is a haloethylene selected from the group consisting of vinyl chloride, vinyl bromide, vinyl fluoride, vinylidene chloride, vinylidene bromide, vinylidene fluoride and mixtures thereof, a plasticizer in an amount at least sufficient to plasticize said polymeric material, and from about 50 to 300% by weight based on the weight of said polymer of a powdered non-hygroscopic material soluble in a non-solvent for said polymer and plasticizer, essentially all of the particles of said non-hygroscopic material passing through about a 65 mesh USS screen and a predominant amount of said particles passing through about a 100 mesh USS screen, calendering the resulting composition as a thin coating on at least one side of a porous web, fusing said coating, and treating said coating with a solvent which is a solvent for said non-hygroscopic material and is essentially a non-solvent for the other ingredients of said composition coating to remove said non-hygroscopic material from said coating to provide a water-resistant, vapor-permeable plasticized polymeric coating on said web.

7. The method which comprises mixing together to form a homogenous appearing composition a polymer of a monomeric material in which each constituent contains a single olefinic double bond and in which the predominant monomer is a haloethylene selected from the group consisting of vinyl chloride, vinyl bromide, vinyl fluoride, vinylidene chloride, vinylidene bromide, vinylidene fluoride and mixtures thereof, a plasticizer in an amount at least sufficient to form a plastisol with said polymer, from 10 to 50% by weight based on the weight of the plastisol of a volatile organic diluent to form an organosol of said plastisol and from about 50 to 300% by weight based on the weight of the polymer of a finely-divided, non-hygroscopic material soluble in a non-solvent for the other ingredient of said composition, essentially all of the particles of said non-hygroscopic material passing through about a 65 mesh USS screen and a predominant amount of said particles passing through about a 100 mesh USS screen, forming a thin layer of the resulting composition on a porous web, fusing said layer and washing said layer with a solvent which is a solvent for said finely-divided, non-hygroscopic material and is essentially a non-solvent for the other ingredients of said composition to remove said non-hygroscopic material from said composition to provide a vapor-permeable, water-resistant plasticized polymeric layer on said web.

References Cited in the file of this patent

UNITED STATES PATENTS

| | | |
|---|---|---|
| 2,006,687 | Riddock | July 2, 1935 |
| 2,537,631 | Greenup et al. | Jan. 9, 1951 |
| 2,663,663 | Weltman et al. | Dec. 22, 1953 |

FOREIGN PATENTS

| | | |
|---|---|---|
| 418,240 | Great Britain | Oct. 22, 1934 |
| 244,901 | Switzerland | July 16, 1947 |